United States Patent
McCrary et al.

(10) Patent No.: US 8,310,492 B2
(45) Date of Patent: Nov. 13, 2012

(54) HARDWARE-BASED SCHEDULING OF GPU WORK

(75) Inventors: Rex McCrary, Ouiedo, FL (US); Frank Liljeros, Sanford, FL (US); Gongxian Jefferey Cheng, Toronto (CA)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 608 days.

(21) Appl. No.: 12/553,637

(22) Filed: Sep. 3, 2009

(65) Prior Publication Data

US 2011/0050713 A1    Mar. 3, 2011

(51) Int. Cl.
  *G06T 1/00*  (2006.01)
  *G06T 1/20*  (2006.01)
  *G06F 9/46*  (2006.01)
(52) U.S. Cl. ........ 345/522; 345/506; 718/102; 718/103; 718/104; 718/105
(58) Field of Classification Search .......... None
See application file for complete search history.

(56) References Cited

U.S. PATENT DOCUMENTS

| | | | | |
|---|---|---|---|---|
| 5,889,779 A | * | 3/1999 | Lincoln | 370/398 |
| 7,659,904 B2 | * | 2/2010 | Kelley et al. | 345/530 |
| 7,673,304 B2 | * | 3/2010 | Gosalia et al. | 718/102 |
| 2004/0199732 A1 | | 10/2004 | Kelley et al. | |
| 2009/0300642 A1 | * | 12/2009 | Thaler et al. | 718/105 |

FOREIGN PATENT DOCUMENTS

EP    1 450 258 A2    8/2004

OTHER PUBLICATIONS

International Search Report and Written Opinion for International Application No. PCT/US2010/047666, mailed on Dec. 1, 2010, 12 pages.

* cited by examiner

*Primary Examiner* — Hau Nguyen
*Assistant Examiner* — Leon T Cain, II
(74) *Attorney, Agent, or Firm* — Sterne, Kessler, Goldstein & Fox P.L.L.C.

(57) ABSTRACT

An apparatus and methods for scheduling and executing commands issued by a first processor, such as a CPU, on a second processor, such as a GPU, are disclosed. In one embodiment, a method of executing processes on a graphics processing unit (GPU) includes monitoring one or more buffers in a memory, selecting a first subset from the one or more buffers for execution on the GPU based on a workload profile of the GPU, and executing the first subset on the GPU. The GPU may also receive a priority ordering of the one or more buffers, where the selecting is further based on the received priority ordering. By performing prioritization and scheduling of commands in the GPU, system performance is enhanced.

24 Claims, 6 Drawing Sheets

HARDWARE-BASED SCHEDULING OF GPU WORK

BACKGROUND OF THE INVENTION

1. Field of the Invention

The present invention relates generally to the scheduling of commands on a processor.

2. Background Art

Graphics processor units (GPU) are rapidly increasing in processing power. The increase in processing power is, at least in part, due to multiple independent processing units (e.g., SIMD processors, ALU) that are included in a GPU. In many graphics applications, the multiple independent processing units are utilized to perform parallel geometry computations, vertex calculations, and/or pixel operations. For example, graphics applications can often be characterized as single instruction multiple data (SIMD), where the same sequence of instructions can executed on multiple parallel data streams to yield substantial speedup of operations.

Another growing trend is the use of GPU for general purpose computations that may not necessarily be SIMD-type computations. The use of the GPU for general computations is referred to as GPGPU-style of computing. In the GPGPU-style of computing, the CPU can use the GPU for performing compute work items that were usually done in the CPU.

Conventionally, work for the GPU, for example, streams of vertices and texture information and instructions to process such information, are scheduled to operate on the GPU by the CPU. Software executing on the CPU may prioritize the various items of work (also referred to as "commands" below) according to some priority order, and enqueue them in a system memory buffer. The GPU asynchronously retrieves the work item to be processed next from the system memory buffers. On the GPU, the selection of the work item to be processed next is based on a priority ordering specified by the CPU. In some instances, the CPU may specify priority on a per work item basis, and in other instances the CPU may specify a priority associated with each memory buffer, and any work item enqueued in a memory buffer will have the priority associated with that buffer.

With the rapid increase of processing capability in the GPU, and also with the increasing use of GPU for general purpose computations, more effective means of more fully utilizing the available computing power of the GPU are needed. What are needed, therefore, are methods and systems that can more effectively allocate the GPU resources to work items.

BRIEF SUMMARY OF EMBODIMENTS OF THE INVENTION

Apparatus and methods for scheduling and executing commands issued by a first processor, such as a CPU, on a second processor, such as a GPU, are disclosed. In one embodiment, a method of executing processes on a graphics processing unit (GPU) includes selecting a first subset of buffers from the one or more buffers in memory for execution of work items from the first subset on the GPU based on a workload profile of the GPU, and executing work items from the first subset on the GPU. The GPU may also receive a priority ordering of the one or more buffers, where the selecting is further based on the received priority ordering.

Another embodiment is a system for executing work items on a GPU. The GPU is configured to select a first subset of buffers from the one or more buffers in memory for execution of work items from the first subset on the GPU based on a workload profile of the GPU, and to execute the first subset on the GPU. The GPU may be further configured to receive a priority ordering of the one or more buffers, where the selecting is further based on the received priority ordering.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF EMBODIMENTS OF THE INVENTION

Embodiments of the present invention may enable substantially improved utilization of graphics processing unit (GPU) resources. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system or computing device having at least two processors, such as a CPU that provides work items (e.g., commands or command buffers) and a GPU that processes work items provided by the CPU. For example and without limitation, embodiments may include computers including laptop computers, personal computers, game platforms, entertainment platforms, personal digital assistants, and video platforms.

In systems having a CPU and a GPU, the utilization of the GPU is a significant factor in overall system performance. Ideally, one would desire to have the GPU utilization at or near maximum. The CPU provides the instructions and data that are used in the GPU. In conventional systems, the CPU would provide substantially all of the instructions and data to the GPU in command buffers, and the GPU would simply take as input those command buffers and execute (i.e., execute the commands from the command buffers). A command buffer is a data structure containing instructions or commands along with associated data. In the conventional systems, any prioritizing of the command buffers was done by the CPU, and the GPU simply executed the commands queued and prioritized by the CPU, in the order specified by the CPU. Although efficient, the conventional approach of the GPU relying solely on the CPU for prioritization of work to be executed on the GPU leaves room for improvement. Embodiments of the present invention are directed towards enabling the GPU to prioritize and schedule the commands specified by the CPU. For example, the GPU can prioritize commands to be executed based on its local resource availability in a more dynamic manner and in a more efficient manner in comparison to the CPU. Furthermore, the GPU can perform a second level of prioritizing beyond any prioritization of commands specified by the CPU.

System for Hardware-Based Scheduling of Commands on GPU

Figure 1:
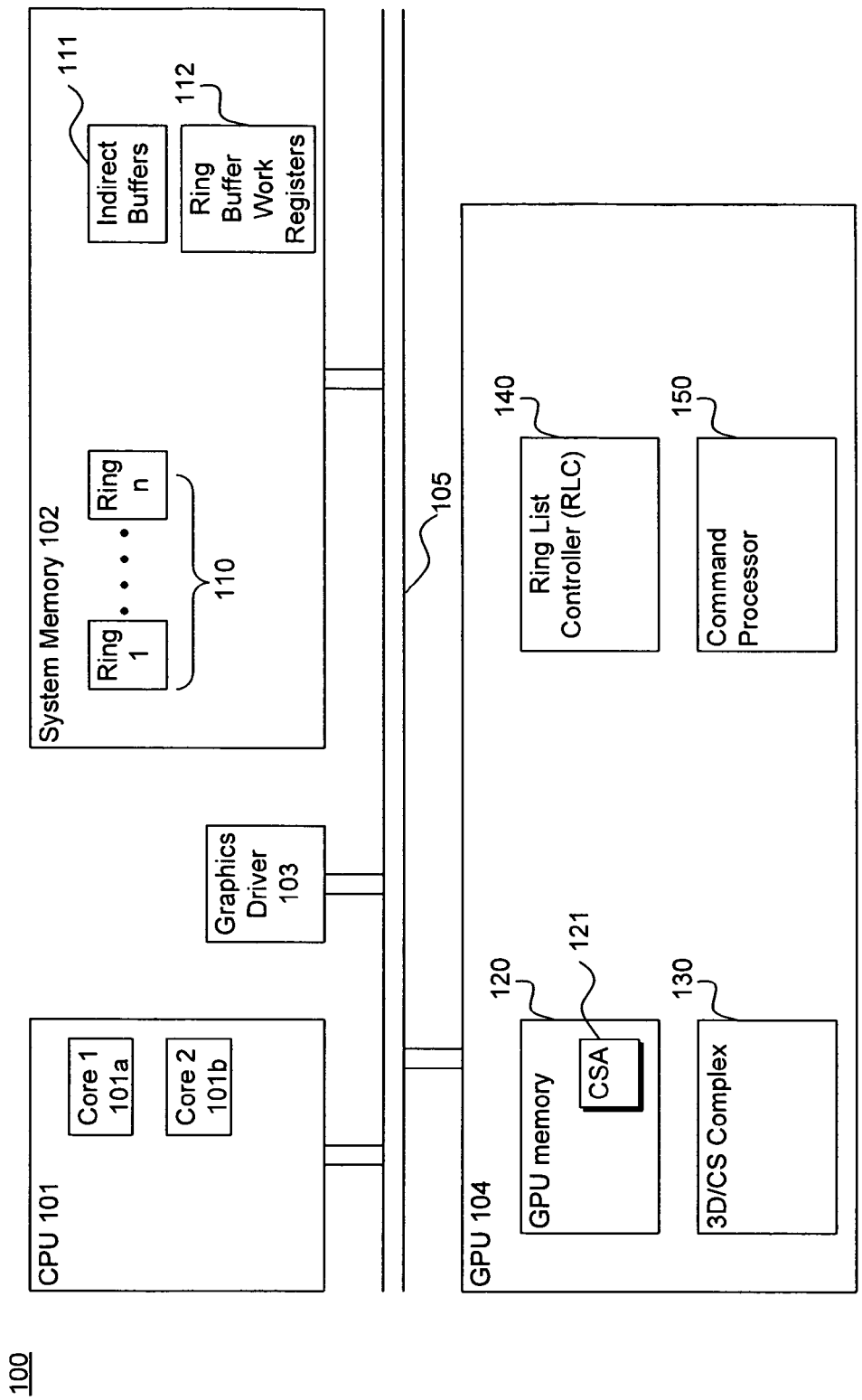
FIG. 1 shows a system, according to an embodiment of the present invention.

FIG. 1 illustrates a system in which work items (e.g., commands) are executed on a GPU, according to an embodiment of the present invention. System 100 includes a CPU 101, a system memory 102, a graphics driver 103, GPU 104, and communication infrastructure 105. A person of skill in the art will appreciate that system 100 may include software, hardware, and firmware components in addition to, or different from, that shown in the embodiment shown in FIG. 1.

CPU 101 can be any commercially available CPU, a digital signal processor (DSP), application specific integrated processor (ASIC), field programmable gate array (FPGA), or a customized processor. CPU 101 can comprise of one or more processors coupled using a communication infrastructure, such as communication infrastructure 105. CPU 101 can also include one or more processors that have more than one processing core on the same die such as a multi-core processor. In the embodiment shown in FIG. 1, CPU 101 can be a dual core processor having processing cores core 1 101a and core 2 101b. CPU 101 executes an operating system (not shown) and one or more applications, and is the control processor for system 100. The operating system executing on CPU 101 controls and facilitates access to devices in system 100. One or more applications executing on CPU 101, including user applications, cause CPU 101 to coordinate the use of various devices of system 100, including GPU 104 and system memory 102, to accomplish the tasks.

System memory 102 includes one or more memory devices. Typically, system memory 102 can be a dynamic random access memory (DRAM) or a similar memory device used for non-persistent storage of data. In some embodiments, system memory 102 can include a memory device such as a flash memory device and or static RAM (SRAM) device. During execution of system 100 in an embodiment, system memory 102 can have residing within it, one or more memory buffers 110 through which CPU 101 communicates commands to GPU 104.

Memory buffers 110 through which CPU 101 communicates commands to GPU 104 can be implemented as ring buffers or other data structure suitable for efficient queuing of work items. In the following memory buffers 110 are referred also to as ring buffers 110. Commands from CPU 101 to GPU 104 can include instructions and data. In some embodiments, data structures having instructions and data are input to a ring buffer 110 by an application and/or operating system executing on CPU 101. CPU 101 (or an application and/or operating system executing on CPU 101) can specify a priority associated with one or more ring buffers 110. Commands may be added to a ring buffer based on a determined priority level of each command. For example, CPU 101 may define one ring buffer each for a high priority commands, low priority commands, and low latency commands.

A set of indirect buffers 111 may be used to hold the actual commands (e.g., instructions and data). For example, when CPU 101 communicates a command buffer to the GPU 104, the command buffer may be stored in an indirect buffer 111 and a pointer to that indirect buffer can be inserted in the ring buffer of the corresponding priority level. It should be noted that indirect buffers 111 can be implemented to enable either a single level of indirection or multiple levels of indirection.

Ring buffer work registers 112 can be implemented in system memory 102 or in other register memory facilities of system 100. Ring buffer work registers 112 provide, for example, communication between CPU 101 and GPU 104 regarding commands in ring buffers 110. For example, CPU 101 as writer of the commands to ring buffers 110 and GPU 104 as reader of such commands may coordinate a write pointer and read pointer indicating the last item added, and last item read, respectively, in ring buffers 110. Other information such as list of available ring buffers 110, priority ordering specified by CPU 101, can also be communicated to GPU 104 through ring buffer work registers 112.

Graphics driver 103 can comprise software, firmware, hardware, or any combination thereof. In an embodiment, graphics driver 103 is implemented entirely in software. During the execution of system 100, graphics driver 103 software can reside in system memory 102. Graphics driver 103 provides an interface and/or application programming interface (API) for the CPU 101 and applications executing on CPU 101 to access GPU 104. Generally, when system 100 comes up the operating system initializes the graphics driver 103 as appropriate for the particular GPU 104.

GPU 104 provides graphics acceleration functionality and other compute functionality to system 100. GPU 104 can include a plurality of processors, such as single instruction multiple data (SIMD) processors including processing elements such as arithmetic and logic units (ALU). Having multiple SIMD processors, in general, makes GPU 104 ideally suited for execution of data-parallel tasks such as is common in graphics processing. For example, when rendering an image on a display, the same or substantially the same instructions are executed on each pixel that is rendered on the display. GPU 104 can also be used for tasks other than graphics operations, such as various compute intensive tasks that can benefit from parallel execution of data streams. In the description below, graphics applications are used for ease of description. A person of skill in the art will, however, recognize that the teachings herein are applicable to numerous other tasks that can be executed on a graphics processor. Also, as will be understood by those of ordinary skill in the art, GPU 104 could be logic embedded in another device such as CPU 101, a bridge chip (such as a northbridge, southbridge or combined device) or the like.

GPU 104 comprises components including a GPU memory 120, a 3-dimension/compute shader complex (3D/CS complex) 130, a ring list controller (RLC) 140, and command processor 150. GPU memory 120 provides a local memory for use during computations in GPU 104, and may include DRAM or such memory device. In an embodiment, GPU 120 includes a plurality of context save areas (CSA) 121. Each CSA provides a memory area for saving the context of work items that are swapped out of execution in GPU 104 before completion as described below.

3D/CS complex 130 is the main computation component within GPU 104, and comprises of a plurality of SIMD processors that facilitates computations including computations on parallel data streams. 3D/CS complex, for example, can include vertex shaders, pixel shaders, geometry shaders, unified shaders, and other components necessary for data computation in GPU 104. In embodiments described below, 3D/CS complex can be considered as comprising 3D computation components, compute shader components, and low latency computation components. The commands sent to the GPU 104 from CPU 101 are implemented using the 3D/CS complex.

Ring list controller (RLC) 140 includes functionality to coordinate the access to memory buffers (such as ring buffers 110). In an embodiment, RLC 140 determines the list of ring buffers 140 that is to be processed in GPU 104, receives any priority ordering of ring buffers 140 specified by CPU 101 (more specifically a process or operating system executing on CPU 101), and determines the scheduling of the ring buffers on GPU 104 in a manner that optimizes the utilization of processing resources in GPU 104. For example, RLC 140 together with command processor 150 can schedule the ring buffers received from CPU 101 in a manner that keeps each SIMD processor in 3D/CS complex 130 at or near maximum utilization.

Command processor 150 controls the processing within GPU 104. Command processor receives instructions to be executed from CPU 101, and coordinates the execution of those instructions on GPU 104. In some instances, command processor may generate one or more commands to be executed in GPU 104, that corresponds to each command received from CPU 101. In an embodiment, command processor 150 together with RLC 140 implements the prioritizing and scheduling of commands on GPU 104 in a manner that maximizes the utilization of GPU 104 resources. Logic instructions implementing the functionality of the command processor 150 and RLC 140 can be implemented in hardware, firmware, or software, or a combination thereof. In one embodiment, command processor 150 is implemented as a RISC engine with microcode for implementing logic including scheduling logic.

Communication infrastructure 105 provides coupling to devices and components of system 100. Communication infrastructure 105 can include one or more communication buses such as Peripheral Component Interconnect (PCI), Advanced Graphics Port (AGP), and the like.

Figure 2:
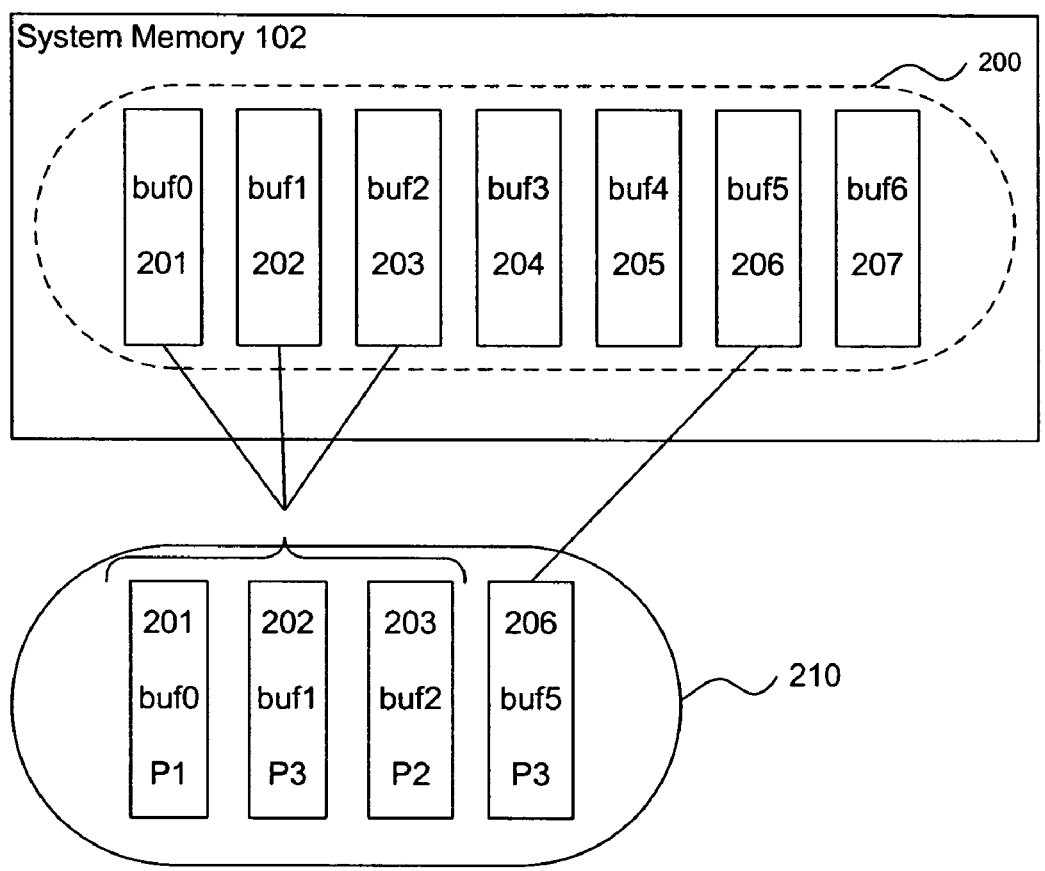
FIG. 2 illustrates an example ring buffer allocation, according to an embodiment of the present invention.

FIG. 2 illustrates an example of ring buffers communicated from CPU 101 to GPU 104. In the example shown, at an instant during the operation of system 100, System memory 102 has configured within it a set 200 of ring buffers, that include ring buffers 0 . . . 6 (i.e., 201, 202, 203, 204, 205, 206, 207). Of the set 200, GPU 104 accesses a subset 210 that include ring buffer 0 201, ring buffer 1 202, ring buffer 2 203, and ring buffer 5 206. Subset 210 may be selected based on the criteria specified by CPU 101, for example, CPU 101 can identify subset 210 as having commands ready to be executed on GPU 104. For example, after enqueuing one or more commands to each ring buffer 201, 202, 203, and 206, CPU 101 can update one or more memory locations, such as a location in ring buffer work registers 112, which is read by GPU 104. In another embodiment, upon writing one or more commands to one or more ring buffers, CPU 101 can directly write into a register within GPU 104 notifying GPU 104 that command buffers are available for processing.

GPU 104 periodically monitors the ring buffers in system memory 102, ring buffer work registers in system memory, and/or other register locations that are updated by CPU 101 to determine if any ring buffers have command buffers that are ready to be processed by GPU 104. Upon detection that one or more ring buffers have command buffers ready to be executed GPU 104 can receive the command buffers for execution (i.e., execution of commands in the command buffers). In an embodiment, GPU 104 may use direct memory access (DMA) or the like to receive the ring buffers specified by the CPU 101 into GPU local memory or into a set of general purpose registers (GPR). The RLC 140 may perform the monitoring of the ring buffers and control the transfer of the ring buffers to GPU memory and/or GPR. Having determined the set of ring buffers to be executed on GPU 104, RLC 140 determines the allocation of the ring buffers to GPU, the prioritization of the ring buffers, and prioritizations of the command buffers within the ring buffers. In some embodiments, the determination of prioritizations is performed by RLC 140 in coordination with command processor 150. For example, in the subset 210 of ring buffers received for execution on GPU 104, a priority ordering as shown of ring buffer 0 as priority level 1, ring buffer 2 as priority level 2, and ring buffers 1 and 5 as priority level 3 may be determined, based on the prioritizations determined by CPU 101 and prioritization determined by GPU 104.

CPU Processing

Figure 3:
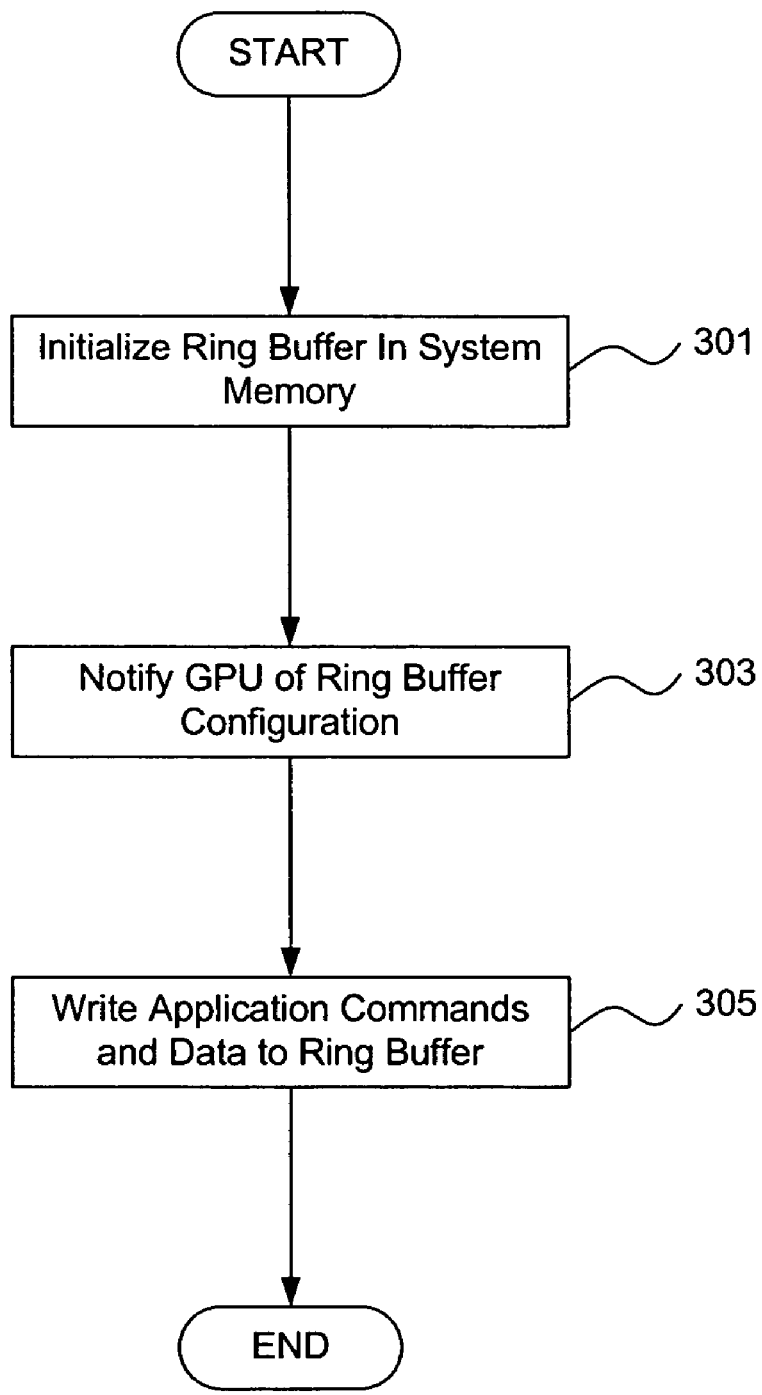
FIG. 3 is a flowchart showing steps in a process implemented in a CPU to convey commands to a GPU for processing in accordance with an embodiment of the present invention.

FIG. 3 illustrates a flowchart of processing steps (e.g., steps 301-305) performed by a CPU, e.g., CPU 101, according to an embodiment of the present invention. In step 301, CPU 101 initializes a set of ring buffers in system memory 103 for purposes of transferring command buffers to GPU 104. Although ring buffers are used in the description here as the data structure of choice for implementing a method for communicating command buffers to the GPU 104, a person of skill in the art will understand that one or more other data structures can be used in place of ring buffers. The initialization step 301, may take place either at system startup or at application startup. For example, at system startup when the operating system executing on CPU 101 configures GPU 104 and associated graphics driver 103 for use, one or more ring buffers may be initialized for use in transferring instructions and data from subsequent applications to the GPU 104. In another example, when an application having code, such as DirectX code, that utilize a GPU is loaded, the ring buffers may be configured as part of the initialization of that application. In yet another example embodiment, one or more ring buffers may be initialized at system startup, and additional buffers may be added and initialized at application startup.

Initialization can include memory allocation, the initialization of data structures corresponding to the ring buffers, and updating one or more registers used to communicate ring buffer configuration information to GPU 104. For example, the initialization of a ring buffer can include the memory allocation for the ring buffer data structure (e.g., a ring buffer 110), allocation of one or more memory areas for holding the actual command buffers associated with ring buffer elements (e.g., indirect buffers 111), and the initialization of one or more registers (e.g., one or more registers in ring buffer work registers 112). The ring buffers and indirect ring buffers may be initialized based on configuration parameters or parameters dynamically determined based on applications that are executed. For example, the number of ring buffers, the size of the ring buffers, the size of indirect buffer area, and the like, can be provided as configuration parameters at system startup, and/or one or more of those parameters can be determined based on application characteristics.

In an embodiment, each ring buffer 110 is implemented as a circular array. Each element of the circular array is intended to accommodate a pointer to a location in the indirect buffer area 111. Each ring buffer data structure would also have parameters needed for the maintenance of the ring buffer structure such as head and tail pointers, etc. The indirect buffer area 111 is intended to accommodate a plurality of data structures corresponding to command buffers. For example, each command buffer can include one or more commands to be executed by GPU and associated data. Storing the actual command buffers in locations different from the ring buffer is advantageous in relation to efficiency of memory utilization. The indirect buffer area 112 can be allocated in various ways including allocating on a per command basis, allocating an area for each ring buffer, or allocating one contiguous area for all ring buffers 110. Ring buffer work registers 112 can include registers and/or other locations. Although ring buffer work registers 112 are shown as configured within system memory 102, a person of skill in the art would appreciate that the ring buffer work registers can include one or more registers in a location other than in system memory 102. For example, ring buffer work registers 112 can include one or more registers in GPU 104. Ring buffer work registers 112 can be utilized to convey information related to the ring buffer usage by CPU 101 to GPU 104. For example, information such as the list of currently active ring buffers, a priority ordering of the active ring buffers as determined by CPU 101, allocation of active ring buffers to one or more GPU elements, can all be conveyed to GPU 104 by CPU 101. In another example, ring buffer work registers 112 can also be used to convey information such as the current read and write pointers for each ring buffer.

In step 303, CPU 101 notifies GPU 104 of the ring buffer configuration. This step may occur at system startup or at application startup subsequent to the initialization of ring buffers in system memory 103 by CPU 101. In some embodiments, step 303 may be performed at system startup as well as at application startup. For example, if the configuration of the number of active ring buffers changes on application startup, such changes would be conveyed to GPU 104. In an embodiment of the present invention, ring buffer configuration information conveyed to GPU 104 includes number of ring buffers, location and size of each ring buffer, and CPU 101 determined priority ordering. Different and/or additional configuration information regarding the frame buffer configuration can be conveyed in various embodiments of the present invention. The notification in step 303 may be based on the CPU 101 writing to one or more register locations monitored by GPU 104, such as ring buffer work registers 112. In another embodiment, an application executing on CPU 101 or the operating system of CPU 101 through the use of graphics driver 103 initiates the notification to the GPU 104. In embodiments of the present invention, graphics driver 103 can write information to be conveyed to GPU 104 into the system memory 102.

In step 305, commands are written to ring buffers. For example, during execution of application such as a game application numerous graphics related commands are executed in order to perform various graphics related tasks including the rendering of images on a display. The application code may utilize a graphics commands using a graphics processing platform such as DirectX. At the time of compiling the application for execution on system 100, or in some instances, more dynamically at run-time, it is determined that certain commands, along with the associated data, are to be offloaded by CPU 101 to be processed on GPU 104. For example, any command invoking a DirectX API to perform a function may be selected for processing on GPU 104. The operating system, or in some embodiments, the application itself, writes the commands that are selected for processing on GPU 104 and the associated data to the ring buffers configured for conveying instructions and data to GPU 104. The commands and the associated data can be formed into data structured generally known as command buffers. Command buffers include one or more instructions and associated data. For example, for a "draw" command, the corresponding command buffer can include the "draw" command as well as the image to be drawn or rendered on a display.

As noted previously, CPU 101 may have a priority ordering determined for the ring buffers through which it conveys command buffers to GPU 104. When writing command buffers in step 305, therefore, each command buffer is enqueued in the ring buffer that best matches the priority level of the command. For example, a game application generates numerous game character image renderings that require almost immediate display and also menus and other user events that are less time critical. Therefore, the command buffers corresponding time critical images can be enqueued to a higher priority ring buffer than the command buffers for the less time critical menus and user events. Writing a command buffer to the appropriate ring buffer can include allocating a memory area to hold the command buffer in indirect buffer area 111, and enqueuing a pointer to the corresponding location in the indirect buffer area 111 in the ring buffer. Inserting a pointer to the indirect buffer 111 in the ring buffer also includes updating the data structure elements of that ring buffer, such as the head and tail pointers. Additionally, CPU 101 may update a value that indicates additional values and pointers that are used in safe concurrent access to the ring buffers by CPU 101 as writer and GPU 104 as reader. Subsequent to writing one or more command buffers to ring buffers, CPU 101 can update one or more registers and/or other memory locations to notify GPU 104 of the availability of data. In some embodiments, no separate notification from CPU 101 may be needed as the GPU 104 may continually monitor the respective ring buffers.

Process 300 is implemented on the CPU 101 in a substantially asynchronous manner from processing in the GPUs to which CPU 101 is coupled. Process 300 enables an application executing on CPU 101 to execute while having multiple commands pending to be processed in other processors such as GPU 104. However, there may be some synchronization mechanisms implemented between CPU 101 and GPU 104, for example, to ensure that the GPU does not get overwhelmed with incoming command buffers. For example, CPU 101 may have techniques in place to detect when ring buffers are not being processed by GPU 104, so that it can react to the slowed processing. CPU 101 may also have mechanisms in place to detect if each command buffer enqueued by it to the ring buffers are consumed by GPU 104. For example, for each command buffer enqueued to a ring buffer, CPU 101 may write a value to a memory location in ring buffer work memory 112. CPU 101 can thereafter periodically check the value at the memory location. When GPU 104 processes the command buffer it can update the respective location in ring buffer work memory 112 with a different value. An unchanged value in the respective location in ring buffer work memory 112 after a timeout period can indicate to CPU 101 that GPU 104 is not functioning properly.

GPU Processing

Figure 4:
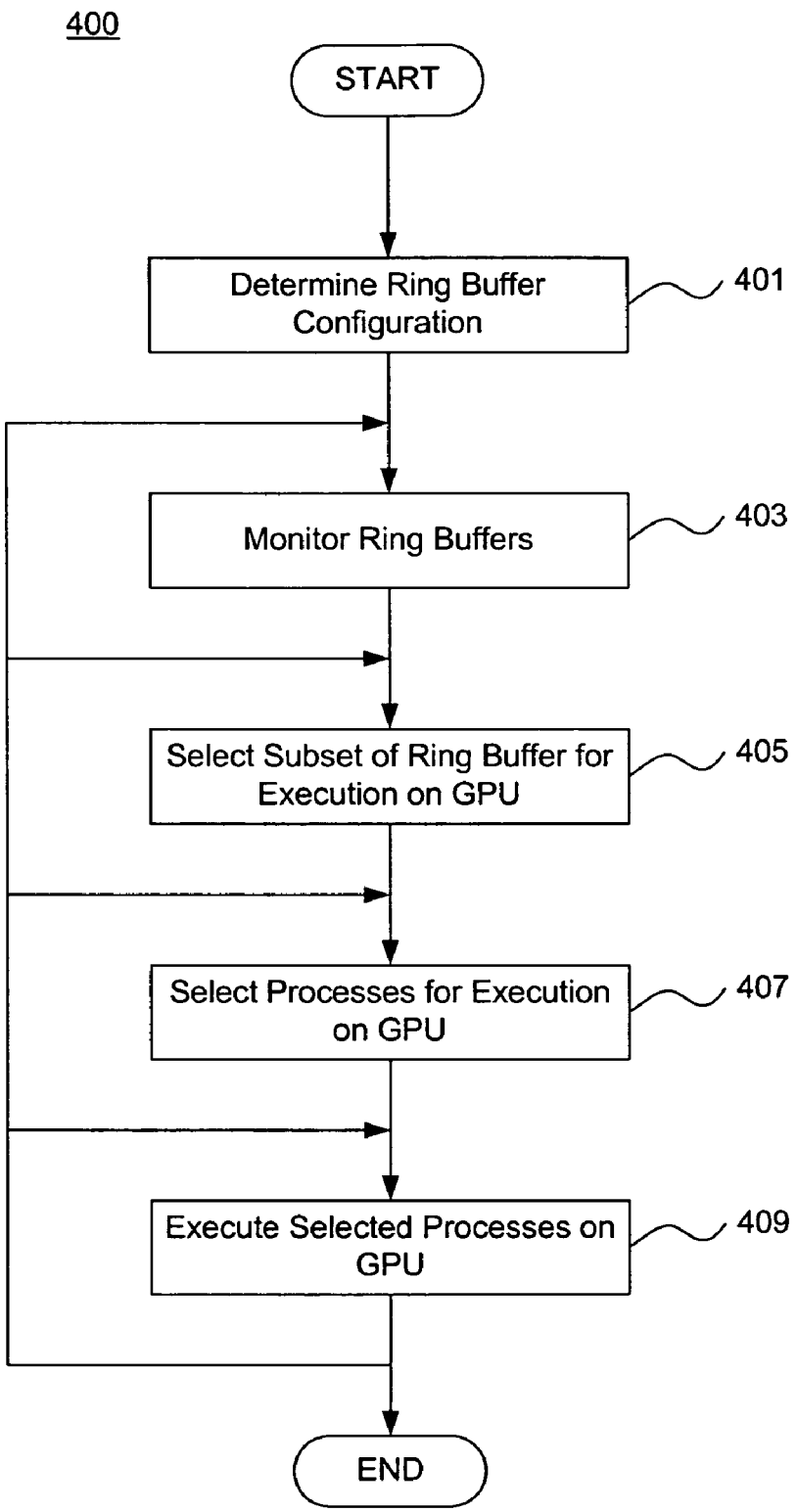
FIG. 4 is a flowchart showing steps in a process implemented in a GPU to process commands received from a CPU, according to an embodiment of the present invention.

FIG. 4 is a flowchart illustrating steps 401-409 of a process 400 that is implemented by GPU 104, according to an embodiment of the present invention. Process 400 can be implemented in hardware, firmware, and/or software in various embodiments of the present invention. For example, the RLC 140 functionality can be implemented using a combination of hardware and microcode to retain a high level of flexibility while also reaching a high level of performance.

In step 401, GPU 104 determines the configuration of ring buffers in system memory 103 through which it received command buffers from CPU 101. Step 401 may be performed at system startup and/or upon application startup. For example, at system startup upon initialization by CPU 101, GPU 104 can determine the configuration of the ring buffers in system memory 103. GPU 104 may also, upon the startup of an application or upon receiving a signal from CPU 101, determine the configuration of the ring buffers. In embodiments where CPU 101 initializes ring buffers 110 at system startup, and does no further additions and/or removals of ring buffers during system operation, then GPU 104 can perform step 104 only at system startup. On the other hand where CPU 101 makes configuration changes to ring buffers 110 at times other than system startup, for example, at application startup, GPU 104 is required to update its view of the ring buffer configurations when such changes occur. The determination of the configuration of ring buffers by GPU 104 may be performed based on a periodic monitoring of the ring buffers or associated registers or memory locations by GPU 104, or based on a message or signal received from CPU 101. In an embodiment, the functionality of step 401 is implemented primarily in RLC 140.

Having determined the configuration of ring buffers 110, in step 403 GPU 104 monitors the ring buffers to detect ring buffers available for processing. For example, as a game application executes on CPU 101, commands for operations requiring graphics processing are enqueued by CPU 101 to ring buffers 110 in the form of command buffers, as described in relation to step 305 of process 300. As command buffers are generated and enqueued to ring buffers in accordance with executing applications, CPU 101 can update one or more memory locations and/or registers to indicate to GPU 104 which ring buffers are available for processing. GPU 104 can monitor such memory locations and/or registers that are updated by CPU 101. In an embodiment, the functionality of step 403 is implemented primarily in RLC 140.

In step 405, GPU 104 selects a subset of ring buffers 110 for processing and execution. Step 405 can be performed in response to detecting command buffers enqueued for processing in ring buffers 110, or in response to a message or signal received from CPU 101. The selection of the subset of ring buffers for processing and execution, for example, the selection of subset 210 from available ring buffers 200 as shown in FIG. 2, may be based on one or more factors. In one embodiment, CPU 101 may maintain a list of ring buffers that it considers are ready for processing in a GPU, and GPU 104 selects from such ring buffers as the subset to be processed. In some embodiments, GPU 104 In another embodiment, CPU 101 simply enqueues command buffers to one or more ring buffers, and GPU 104 selects one or more ring buffers that have enqueued command buffers pending for execution.

The subset of sing buffers selected for execution can, in some embodiments, be brought into GPU local memory or GPR in preparation for processing within GPU 104. The transfer of command buffers from system memory 102 can be controlled by a DMA process. When command buffers are read from system memory 103, GPU 104 can update one or more memory locations to indicate what command buffers have been read and if each of the command buffers were processed. Such memory locations that are updated may be in ring buffer work registers 112, within ring buffer data structures, and/or within GPU local memory or GPR. In an embodiment, the functionality of step 403 is implemented primarily in RLC 140.

Figure 5:
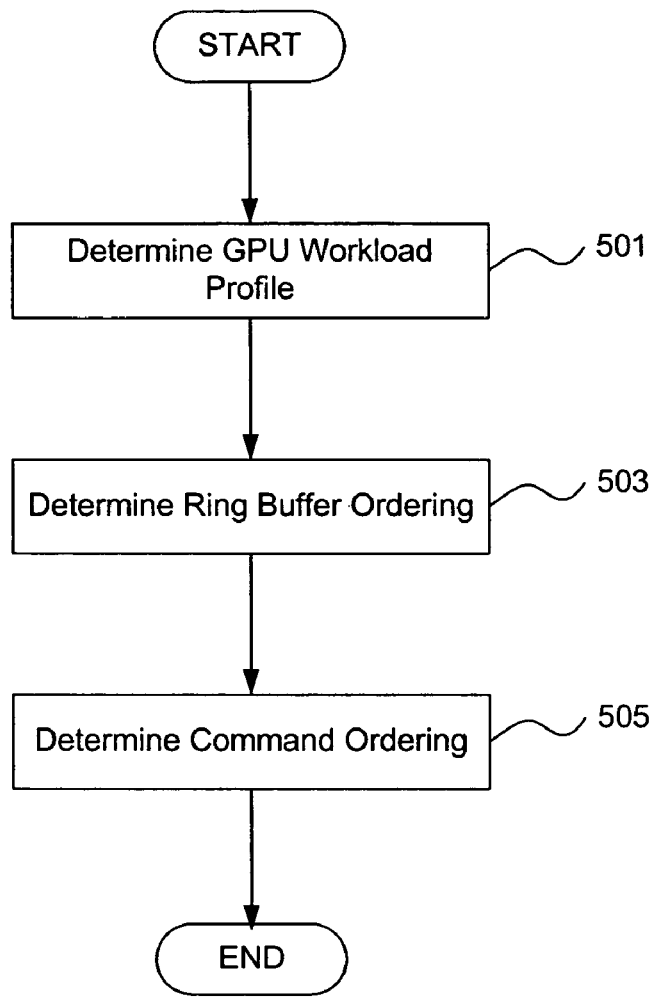
FIG. 5 is a flowchart showing steps in a process implemented in a GPU to prioritize and schedule commands for execution, according to an embodiment of the present invention.

In step 407, GPU 104 selects command buffers for execution on the GPU according to priority criteria. During the processing of this step, GPU 104 determines how the ring buffers selected in the previous step are allocated to the one or more GPUs, and also how the individual commands are allocated to resources within a GPU. For example, GPU 104 may determine the priority ordering in which the subset of ring buffers 210 selected in step 405 from system memory 103 is to be processed on GPU 104, and, in some embodiments, also how commands are prioritized and scheduled during the processing of each ring buffer. hi an embodiment, the functionality of step 403 is implemented primarily in RLC 140. FIG. 5 further describes the processing in step 407.

In step 409, selected commands are executed on GPU 104, according to the priority orderings determined in GPU 104 in the previous step. In one embodiment, ring buffer subset 210 selected for execution is ordered according to a priority for execution on GPU 104. Within each ring buffer, commands can be prioritized and scheduled for execution, or executed in the order of appearance in the ring buffer. hi another embodiment, GPU 104 can periodically determine a prioritization of all command buffers pending processing, taking into consideration multiple factors such as the prioritization assigned by CPU 101, type of ring buffer or type of command buffer, processing resource availability on GPU 104, and the like.

Executing commands received in command buffers from CPU 101 can include command processor 150 generating one or more commands corresponding to the received command and scheduling the command on processing resources on GPU 104. For example, a single command received from CPU 101 to render an image may cause command processor 150 to subdivide the image and to generate one or more instructions to process each one of the subdivided parts of the image. Command processor then schedules each one of the subdivided parts to be executed on a processing resource such as a SIMD processor and/or ALU in GPU 104. The scheduling of commands for execution, and execution of the commands on the GPU are mainly directed by command processor 150 in coordination with RCL 140 that specifies the priority ordering of the commands.

Execution of commands can proceed in various ways consistent with the present invention. In one embodiment, as each command completes execution and a processing resource is made available, the next command according to priority is executed on that processing resource. Embodiments can also implement methods where other factors are considered in selecting the next command to be executed, beyond the prioritization done before. For example, the pending commands can be evaluated and the command most likely to optimally utilize the available resources at any time may be scheduled as the next command to be executed. In yet other embodiments of the present invention, at the completion of execution of some number and/or types of commands in GPU 104, GPU 104 can return to step 405 and re-select ring buffers available processing.

Figure 6:
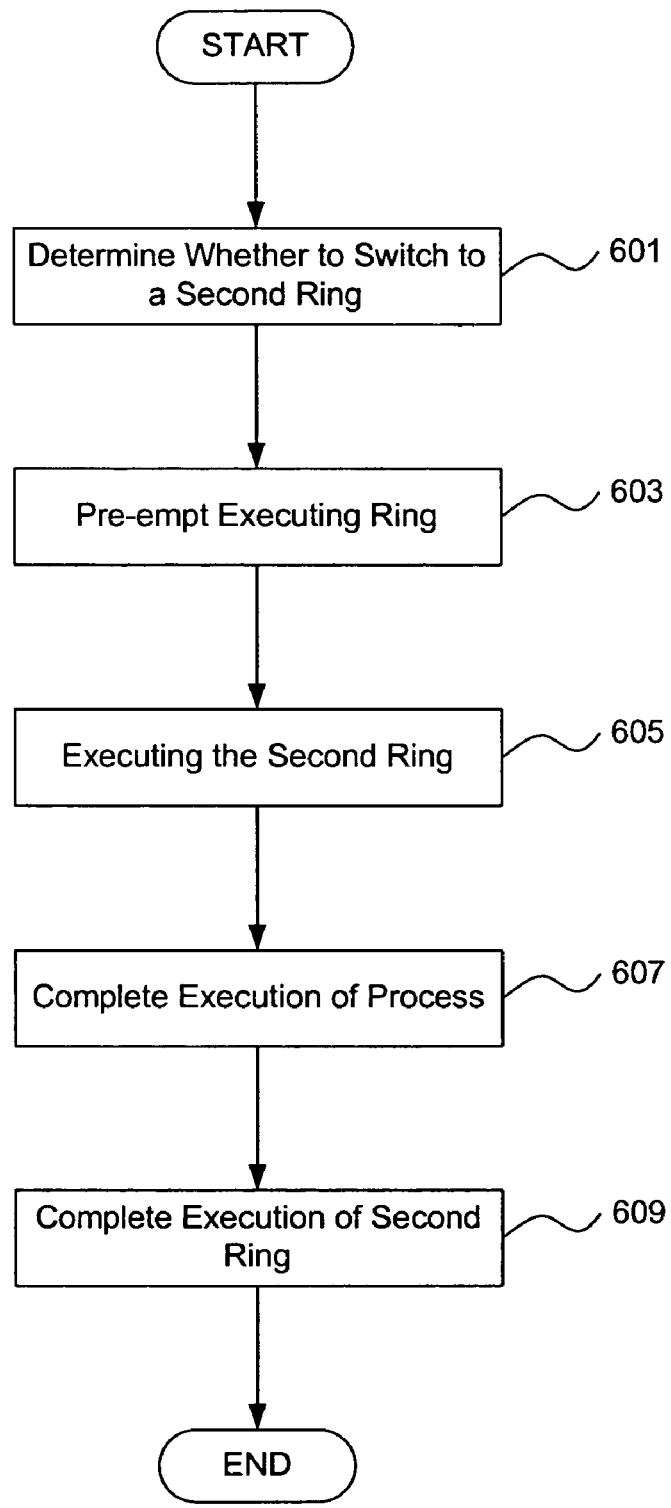
FIG. 6 is a flowchart showing steps in a process implemented in a GPU to execute commands, according to an embodiment of the present invention.

In general, during the execution of commands in GPU 104, RLC 140 or another component of GPU 104 continues monitoring of the ring buffers in system memory, such as ring buffers 110. The continued monitoring enables GPU 104 to detect, for example, when command buffers are added to a high priority queue. Having one or more command buffers added to a high priority ring buffer by CPU 101, during the execution of one or more lower priority commands by GPU 104, can cause GPU 104 to pre-empt one or more commands such that the higher priority commands can be executed. FIG. 6 shows steps 601-609 that can be implemented, according to an embodiment of the present invention, to enable GPU 104 to accommodate higher priority commands during the execution of one or more lower priority commands. For example, steps 601-609 may be implemented during the processing of step 409.

FIG. 5 shows steps 501-505 that implement step 407 discussed above, according to an embodiment of the present invention. Steps 501-505, implemented primarily by RLC 140 and command processor 150, enable GPU 104 to determine the priority ordering of the ring buffers and the command buffers.

In step 501, a profile of the current workload of GPU 104 is determined. In an embodiment, RLC 140 and/or command processor 150 determine factors such as processing elements available for use, relative processing capabilities of the processing elements, the pending workload, and the current priority ordering of the pending workload, to create a workload profile. The workload profile reflects the state of the GPU. Determination of the processing elements available use and the relative processing capabilities of each, may include the consideration of separate processing elements, such as SIN/ID elements, ALU capabilities, 3D processing devices, compute shader device, and low latency processing device. The profiling of the current workload of the GPU can be performed dynamically on a continuous basis or periodically. For example, RLC 140 and/or command processor 150 may initiate the profiling of the GPU workload when a command or ring buffer completes execution, or when a new subset of ring buffers are read from system memory. The workload profile can also be generated new each time a determination of the workload is needed, or can be maintained in a manner in which it is updated upon the occurrence of predetermined types of events, such as execution completing of a ring buffer, the reading of a subset of ring buffers from system memory, and the like.

In step 503, GPU 104 determines a priority ordering of the ring buffers that are pending execution on GPU 104. In an embodiment, RLC 140 and command processor 150, determine the ordering based on the workload profile determined in the previous step 501. The priority ordering determined by GPU 104 can be based on the ordering of the ring buffers specified by CPU 101. The priority ordering specified by CPU 101 can be substantially adhered to while optimizing the actual execution order based on dynamic workload profiles of the GPU. The ability to dynamically reorder its execution sequence enables the GPU to have fine grained control over how its processing components are utilized.

In step 505, GPU 104 determines a priority ordering of commands associated with each of the ring buffers. For example, RLC 140 and command processor 150 can determine the ordering based on the workload profile determined in the previous step 501 and the ring buffer prioritization determined in step 503. The priority ordering of the commands in the ring buffer can involve determination as to what processing component within the GPU each command is allocated. The ability to reorder the execution of commands within respective ring buffers enables the GPU to better utilize its resources by making dynamic determinations, for example, to execute commands that are originally designated as low priority as high priority if the high priority processing resources are available, or to execute high priority commands as low priority where high priority resources are occupied, or by executing commands that would usually be executed on a compute shader component on a low latency component based on component availability.

FIG. 6 shows steps 601-609 that can be implemented, according to an embodiment of the present invention, to enable GPU 104 to accommodate higher priority commands during the execution of one or more lower priority commands. For example, steps 601-609 may be implemented during the processing of step 409.

In step 601, GPU 104 determines if a context switch is required to process another command. The determination if a context switch is required may be based on one or more factors such as the priority of the processes that are currently executing, the priority of the processes that require execution, execution time slice values, and remaining time of execution for each currently executing process. Command processor 150, for example, can include functionality to consider one or more factors such as above and make a determination as to whether a context switch should be forced.

In step 603, the executing command and/or the executing ring buffer is pre-empted. Pre-empting the executing command and/or the executing ring buffer includes saving the state of the pre-empted command and/or ring buffer. In embodiments of the present invention, the state of the pre-empted command and/or ring buffer is saved in a context save area (CSA) configured in the GPU local memory. For example, if the currently executing ring buffer is to be pre-empted, the state of the ring buffer including its pending commands, data, and execution parameters such as program counters, and the like are saved to an area in GPU local memory such as CSA 121 in GPU memory 120.

In step 605, another command and/or another ring buffer is swapped into execution by RLC 140 and command processor 150. The command and/or ring buffer swapped into execution can be executing for the first time on GPU 104 or can be a command and/or ring buffer that is restored from a CSA. For example, the swapped in command and/or ring buffer could have previously executed to the end of its time slice and been saved to a CSA at the end of its time slice.

In step 607, the currently executing command completes execution. When the currently executing command completes execution, the next command in the same ring buffer can be executed. In embodiments of the present invention, GPU 104 can determine the execution order of the commands within a ring buffer, as discussed in relation to step 407 of process 400. In some embodiments, upon the completion of execution of a process GPU 104 may perform an action such as checking for higher priority ring buffers for execution or checking for a higher priority command in the same ring buffer, to determine the process and/or ring buffer for next execution.

In step 607, the currently executing ring buffer completes execution of all pending commands associated with it. Upon the completion of execution of a ring buffer, GPU 104 can select another ring buffer, e.g., the ring buffer next in the order of priority, for execution.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the invention as described herein.

Conclusion

The present invention, as described by the embodiments described above, enables more efficient allocation of processing resources within a second processor such as a GPU that receives commands from a first processor such as a CPU. The ability to prioritize and schedule its workload based on locally determined factors such as processing device availability, workload, and the like, increases the utilization of the second processor.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of processing work items on a graphics processing unit (GPU), comprising:
   changing a priority ordering of one or more buffers written to by a CPU in a memory to reorder an execution sequence of the one or more buffers:
   selecting a first subset of buffers from the one or more buffers according to the changed priority ordering for execution of work items from the first subset on the GPU, wherein the changing and the selecting are responsive to a dynamically determined workload profile of the GPU; and
   executing said work items from the first subset on the GPU in accordance with the reordered execution sequence.

2. The method of claim 1, further comprising:
   receiving the priority ordering of the one or more buffers from the CPU before the changing.

3. The method of claim 1, wherein the executing comprises:
   executing on the GPU, work items from a first buffer from the first subset;
   determining that work items from a second buffer is to be executed on the GPU;
   pre-empting work items from the first buffer from execution; and
   initiating execution of work items from the second buffer on the GPU.

4. The method of claim 3, wherein the pre-empting comprises:
   saving a context of the first ring buffer to a context save area in a local memory.

5. The method of claim 3, wherein the determining comprises:
   comparing a time elapsed in execution of work items from the first buffer to a predetermined time slice value.

6. The method of claim 3, wherein the determining comprises:
   monitoring at least one of said buffers; and
   detecting a work item in said at least one of said buffers having a priority level higher than the first buffer.

7. The method of claim 6, wherein the monitoring comprises:
   reading at least one memory location written by a second processor; and
   detecting a command write event based on a value read from the at least one memory location.

8. The method of claim 1, wherein the selecting comprises:
   analyzing work items in each of the buffers;
   determining a priority of said work items in each of the buffers; and
   selecting the first subset based on the determined priority.

9. The method of claim 1, further comprising using a system memory coupled to a central processing unit (CPU) and the GPU as the memory.

10. The method of claim 1, further comprising using a ring buffer for at least one of the one or more buffers.

11. The method of claim 1, further comprising selecting one or more command buffers written by a CPU for each of the buffers in the first subset.

12. A system for executing work items on a graphics processing unit (CPU), the GPU configured for:
    changing a priority ordering of one or more buffers written to by a CPU in a memory to reorder an execution sequence of the one or more buffers:
    selecting a first subset of buffers from the one or more buffers according to the changed priority ordering for execution of work items from the first subset on the GPU, wherein the changing and the selecting are responsive to a dynamically determined workload profile of the GPU; and
    executing said work items from the first subset on the GPU in accordance with the changed execution sequence.

13. The system of claim 12, wherein the GPU is further configured for:
    receiving the priority ordering from the CPU before the changing.

14. The system of claim 12, wherein the GPU is further configured for:
    executing a first buffer from the first subset;
    determining that a second buffer is to be executed on the GPU;
    pre-empting the first buffer from execution; and
    initiating execution of the second buffer on the GPU.

15. The system of claim 14, wherein the pre-empting comprises:
    saving a context of the first ring buffer to a context save area in a local memory.

16. The system of claim 14, wherein the determining comprises:
    monitoring at least one of said buffers; and
    detecting a work item in said at least one of said buffers having a priority level higher than the first buffer.

17. The system of claim 12, wherein at least one of the one or more buffers is a ring buffer.

18. The system of claim 12, further comprising:
    a central processor unit (CPU); and
    the memory, coupled to the CPU and the GPU.

19. The system of claim 12, wherein the GPU comprises:
    a local memory configured with one or more context save areas.

20. A non-transitory computer readable storage media storing instructions wherein said instructions when executed are adapted to process work items on a graphics processing unit (GPU) using a method comprising:

changing a priority ordering of one or more buffers written to by a CPU in a memory to reorder an execution sequence of the one or more buffers;

selecting a first subset of buffers from the one or more buffers according to the changed priority ordering for execution of work items from the first subset on the GPU, wherein the changing and the selecting are responsive to a dynamically determined workload profile of the GPU; and executing said work items from the first subset on the GPU in accordance with the changed execution sequence.

21. The non-transitory computer readable storage media of claim 20 wherein said instructions comprise hardware description language instructions.

22. The non-transitory computer readable storage media of claim 20 wherein said instructions are adapted to configure a manufacturing process through the generation of maskworks/photomasks to generate a device for processing said work items on a GPU.

23. The method of claim 1, wherein the dynamically determined workload profile includes availability of processing components of the GPU, and wherein the selecting further includes changing the priority ordering to increase utilization of the processing components.

24. The method of claim 1, wherein the selecting is performed by the GPU.

\* \* \* \* \*

UNITED STATES PATENT AND TRADEMARK OFFICE
CERTIFICATE OF CORRECTION

PATENT NO. : 8,310,492 B2  
APPLICATION NO. : 12/553637  
DATED : November 13, 2012  
INVENTOR(S) : McCrary et al.

Page 1 of 1

It is certified that error appears in the above-identified patent and that said Letters Patent is hereby corrected as shown below:

Column 13
Line 51, Claim 3, please replace "is" with --are--.

Column 14
Line 24, Claim 12, please replace "CPU" with --GPU--.

Signed and Sealed this
Twenty-fifth Day of December, 2012

David J. Kappos
*Director of the United States Patent and Trademark Office*